United States Patent
Brown

(10) Patent No.: US 7,868,743 B1
(45) Date of Patent: Jan. 11, 2011

(54) ALARM TERMINATION FLOOR APPARATUS

(76) Inventor: Chester Brown, 186 Beech St., Floral Park, NY (US) 11001

( * ) Notice: Subject to any disclaimer, the term of this patent is extended or adjusted under 35 U.S.C. 154(b) by 119 days.

(21) Appl. No.: 11/690,756

(22) Filed: Mar. 23, 2007

(51) Int. Cl.
- G08B 1/00 (2006.01)
- G08B 23/00 (2006.01)
- G04B 47/00 (2006.01)
- G01G 23/18 (2006.01)

(52) U.S. Cl. .............................. 340/309.4; 340/309.16; 340/309.8; 340/309.9; 340/573.1; 340/691.1; 368/1; 368/10; 177/12; 177/45; 177/48; 177/177

(58) Field of Classification Search .............. 340/309.4; 177/12, 45, 48, 177
See application file for complete search history.

(56) References Cited

U.S. PATENT DOCUMENTS

| | | | | |
|---|---|---|---|---|
| 2,460,133 A | * | 1/1949 | La Pedus | 368/12 |
| 3,961,201 A | * | 6/1976 | Rosenthal | 307/116 |
| 4,316,273 A | * | 2/1982 | Jetter | 368/47 |
| 4,352,171 A | * | 9/1982 | Jetter | 368/73 |
| 4,426,157 A | * | 1/1984 | Jetter | 368/73 |
| 5,379,273 A | * | 1/1995 | Horinek | 368/73 |
| 5,764,153 A | * | 6/1998 | Vedaa | 340/666 |

FOREIGN PATENT DOCUMENTS

| | | | |
|---|---|---|---|
| DE | 4428751 | * | 6/1995 |
| GB | 1551191 | * | 8/1979 |
| JP | 56143984 | * | 11/1981 |
| JP | 7294672 | * | 11/1995 |

* cited by examiner

*Primary Examiner*—Donnie L Crosland
(74) *Attorney, Agent, or Firm*—Michael I Kroll

(57) ABSTRACT

An alarm that uses a floor situated apparatus so that when the alarm goes off, the user must place their feet on the apparatus for a predetermined period of time to deactivate the alarm. The alarm sequence optionally provides that the apparatus cover may be translucent and/or transparent with a plurality of illuminable elements thereunder providing an alarm visual display. Also provided is a remote control for actuating a projected display of time onto the wall. The apparatus is also a scale for displaying the user's weight. The weight requirement for deactivating the alarm can extend from placing the feet on the apparatus while still in bed or require the user to stand on the apparatus for said period of time. Further provided for is the removal of the alarm clock portion from the floor apparatus.

19 Claims, 15 Drawing Sheets

COVER OF PLATFORM IS ILLUMINATED

STEP 1

STEP 2

STEP 3

ALARM TERMINATION FLOOR APPARATUS

BACKGROUND OF THE INVENTION

1. Field of the Invention

The present invention relates generally to alarms and, more specifically, to an alarm that uses a floor situated apparatus so that when the alarm goes off, the user must place their feet on the apparatus for a predetermined period of time to deactivate the alarm. The alarm sequence optionally provides that the apparatus cover may be translucent and/or transparent with a plurality of illuminable elements thereunder providing an alarm visual display. Also provided is a remote control for actuating a projected display of time onto the wall. The apparatus is also a scale for displaying the user's weight. The weight requirement for deactivating the alarm can extend from placing the feet on the apparatus while still in bed or require the user to stand on the apparatus for said period of time. Further provided for is the removal of the alarm clock portion from the floor apparatus.

2. Description of the Prior Art

There are other wake up alarms designed for similar purpose. Typical of these is U.S. Pat. No. 2,460,133 issued to Pedus on Jan. 6, 1945.

Another patent was issued to Rosenthal on Jun. 1, 1976 as U.S. Pat. No. 3,961,273. Yet another U.S. Pat. No. 4,316,273 was issued to Jetter on Feb. 16, 1982 and still yet another was issued on Sep. 28, 1982 to Jetter as U.S. Pat. No. 4,352,171.

Another patent was issued to Jetter on Jan. 17, 1984 as U.S. Pat. No. 4,426,157. Yet another U.S. Pat. No. 5,379,273 was issued to Horinek on Jan. 3, 1995. Another was issued to Vedaa on Jun. 9, 1998 as U.S. Pat. No. 5,764,153 and still yet another was issued on Oct. 11, 1981 to Jietsutaa as Japan Patent No. JP56143984.

Another patent was issued to Nickolas on Aug. 19, 1977 as Ireland Patent No. Ireland 1,551,191. Yet another German Patent No. DE4428751 was issued to Horst on Jun. 22, 1995. Another was issued to Yasuki on Nov. 10, 1995 as Japan Patent No. JP7294672.

U.S. Pat. No. 2,460,133

Inventor: William La Pedus

Issued: Jan. 25, 1949

An alarm device, a pressure resisting casing providing a hollow interior and a smooth exterior, a spring member secured to said casing and extending from the inner wall thereof to a point approaching the opposite wall of said casing, a vibrating arm on said spring member, a coil magnet for subjecting said arm to magnetic impulses, means for supplying alternating current to said coil, timing mechanism controlling said last mentioned means to energize said coil after a predetermined time, and a resilient body spaced from and engaging said vibrating arm to limit the stroke thereof and to dampen the sound thereof.

U.S. Pat. No. 3,961,201

Inventor: Morris Rosenthal

Issued: Jun. 1, 1976

A tape switch near the edge of a bed frame closes a warning signal circuit when the weight of a patient near the edge of the bed presses on an actuating switch arm that is cantilevered from the bed frame.

U.S. Pat. No. 4,316,273

Inventor: Milton Jetter

Issued: Feb. 16, 1982

An alarm clock system consisting of a clock with a local alarm circuit and provided with a remotely located turn-off control device actuated by a push button switch. The local alarm system, in response to an electrical signal produced by the clock at a preset time, generates a first sound in the form of a continuous tone lasting for 40 seconds, followed by a strident pulsating sound for another 40 seconds. To turn off the alarm, the user must get out of bed, walk to the remote location, and then depress the switch push button and hold it for a predetermined time, such as 12 seconds. Actuation of the push button switch causes the remote control component to generate and transmit a radio signal, which is detected by a radio receiver in the alarm clock local component. Also, an indicating lamp on the remote component is energized and goes off after 12 seconds of continuous depression of the push button. The radio signal received by the local component causes interruption of the alarm and completely deactivates the alarm mode after 12 seconds of push button depression. If the pushbutton is released, namely, before 12 seconds, transmission of the radio signal stops and the clock alarm resumes. The push button must again be depressed to start another alarm-deactivation period. The system is arranged so that if so desired, a direct connection of the pushbutton switch alarm turn-off component can be made to the clock component, and the radio link is not used. As another alternative, the remote transmitter can be coupled to the clock radio receiver by a coaxial cable.

U.S. Pat. No. 4,352,171

Inventor: Milton Jetter

Issued: Sep. 28, 1982

An alarm clock with a local alarm system including a movement-operated switch, a normally-closed key-operated switch and an audible alarm device connected in series across the power lines. The switch-operating key may be remotely located so as to require the user to leave his bed in order to obtain the key, insert it in the key-operated switch, and turn the key so as to shut off the alarm. The system may include a time delay latching arrangement to prevent immediate latching the key switch open and to require the user to hold the key turned for a predetermined delay period, sufficient to produce wakefulness of the user. A signal lamp shows the delay period to be in effect until the period has been completed, thereby requiring the user to manually hold the key-operated switch open until the lamp becomes extinguished.

U.S. Pat. No. 4,426,157

Inventor: Milton Jetter

Issued: Jan. 17, 1984

An alarm clock with an alarm system which can be deactivated by means of either a local or remote manually operated push button switch which must be held in a depressed condition for a predetermined period of time in order to effectively deactivate the clock alarm. Means is provided to adjust the length of required switch hold-down time. An indicator is provided for showing the completion of the required hold-down period. In the case of remote deactivation, wherein the user must walk to the location of the push button switch, a radio link is employed to couple the remotely located switch with the locally positioned clock alarm system and to provide the desired alarm deactivation. The completion of the hold down period is signaled either by visual indicating means or by audible sounding means. Failure to complete the required hold-down period causes the normal audible alarm signal to be turned back on, and a new switch hold-down cycle for the required preset time period must be commenced for deactivation of the alarm. Local/remote switching circuitry is provided to allow the user to select a preferred control location for terminating an alarm cycle. The system may comprise separable modules and may include a separable standard broadcast radio receiver module.

U.S. Pat. No. 5,379,273

Inventor: Kevin Horinek

Issued: Jan. 3, 1995

An alarm clock system with a remote control is provided, which includes an alarm clock base unit with an audible alarm, and a remote controller for suspending, or delaying, operation of an activated alarm signal. A limited number of times in which such delaying of the alarm signal can be activated may be pre-selected, for stimulating the operator to rise out of bed in order to deactivate the alarm.

U.S. Pat. No. 5,764,153

Inventor: Richard Vedaa

Issued: Jun. 9, 1998

A new Pressure Controlled Alarm Clock System for providing an alarm clock alarm which can not be turned off unless a user is removed from a bed, and where the alarm restarts if the user returns to the bed in a predetermined amount of time. The inventive device includes an alarm clock, a pressure switch normally open and in communication with the alarm clock to control the alarm, the pressure switch is positioned medial a box spring and a mattress for determining if the user is in or out of the bed. The pressure switch further includes an adjustment member for adjusting the sensitivity of the pressure switch. A heat sensing pad may be utilized as an alternative to the pressure switch thereby detecting the user's body heat near the surface of the mattress.

Japan Patent Number JP56143984

Inventor: Miruton Daburiyuu Jietsutaa

Issued: Nov. 10, 1981

An alarm clock system consisting of a clock with a local alarm circuit and provided with a remotely located turn-off control device actuated by a push button switch. The local alarm system, in response to an electrical signal produced by the clock at a preset time, generates a first sound in the form of a continuous tone lasting for 40 seconds, followed by a strident pulsating sound for another 40 seconds. To turn off the alarm, the user must get out of bed, walk to the remote location, and then depress the switch push button and hold it for a predetermined time, such as 12 seconds. Actuation of the push button switch causes the remote control component to generate and transmit a radio signal, which is detected by a radio receiver in the alarm clock local component. Also, an indicating lamp on the remote component is energized and goes off after 12 seconds of continuous depression of the push button. The radio signal received by the local component causes interruption of the alarm and completely deactivates the alarm mode after 12 seconds of push button depression. If the pushbutton is released, namely, before 12 seconds, transmission of the radio signal stops and the clock alarm resumes. The push button must again be depressed to start another alarm-deactivation period. The system is arranged so that if so desired, a direct connection of the pushbutton switch alarm turn-off component can be made to the clock component, and the radio link is not used. As another alternative, the remote transmitter can be coupled to the clock radio receiver by a coaxial cable.

Ireland Patent Number 1,551,191

Inventor: Noel Nicholas

Issued: Aug. 19, 1977

A load operated electric switch comprising a housing having a base, a pressure plate mounted for vertical movement relative to the base, spring means extending upwardly from a supporting surface in the housing below the pressure plate and biasing the pressure plate upward.

Germany Patent Number DE4428751

Inventor: Hug Horst

Issued: Jun. 22, 1995

The clock has a timepiece mechanism which responds to the actual time reaching the selected alarm time to supply a voltage to an IC (5) for activating an acoustic alarm signal source (17) and a pulsed IR or ultrasonic transmitter (16), the signal from the transmitter is reflected by the user to provide an alarm cut-out signal, detected by a receiver (28), for controlling a threshold switch, for cut-out of the alarm signal source. The receiver is coupled to the threshold switch via an amplifier (29, . . . 31), the transmitter initially operated in a test phase with different power levels and held at the highest possible power without a voltage signal being provided at the output of the threshold switch.

Japan Patent Number JP7294672

Inventor: Sonobe Yasuki

Issued: Nov. 10, 1995

PURPOSE: To effectively promote wakeup by placing a servant device or a remote controller of an alarm clock in a place other than the placing location of the alarm clock and generating such a state that one has to get up to stop the alarm clock. CONSTITUTION: In an alarm clock body 1, infrared luminescence diode 2 is placed, and in a servant device 6, an infrared receiver 8 is placed. When the buzzer of the alarm clock 1 starts ringing at the set time, the buzzer is terminated with a relay switch 3 and then the infrared signal emitted from the diode 2 is received by the receiver 8 of the servant device 6 and the buzzer of the servant start ringing. Although this buzzer can be stopped with the relay switch 7, one needs to get one of the bed and go to the place of the servant device 6 and thus, his working up is promoted. In the case of an alarm clock with a remote controller, the alarm clock is provided with an infrared receiver and constituted so that one has to go out of the bed to the location of the remote controller with the infrared luminescence part to stop the alarm clock having started ringing at the set time.

While these alarms may be suitable for the purposes for which they were designed, they would not be as suitable for the purposes of the present invention, as hereinafter described. The present invention provides a foot terminated wake up alarm with digital weight display unit that sits on the floor and has a remote shut-off switch that the user stands on to shut off the alarm. The shut off switch having a timed standing duration before shut-off. The alarm having a scale for displaying weight of user and also having a time display. The alarm portion of the device is removable from the scale portion and may be used independent from said device.

SUMMARY OF THE PRESENT INVENTION

A primary object of the present invention is to provide a foot canceled wake up alarm with digital weight display.

Another object of the present invention is to provide a foot canceled wake up alarm that sits on the floor.

Yet another object of the present invention is to provide a foot canceled wake up alarm that has a remote shut-off switch that the user stands on to shut off the alarm.

Still yet another object of the present invention is to provide a foot canceled wake up alarm that the shut off switch having a timed standing duration before shut-off.

Another object of the present invention is to provide a foot canceled wake up alarm that the alarm having a scale for displaying weight of user and also having a time display.

Yet another object of the present invention is to provide a foot canceled wake up alarm that the alarm portion of the device is removable from the scale portion and may be used independent from said device.

Additional objects of the present invention will appear as the description proceeds.

The present invention overcomes the shortcomings of the prior art by providing an alarm that uses a floor situated apparatus so that when the alarm goes off, the user must place their feet on the apparatus for a predetermined period of time to deactivate the alarm. The alarm sequence optionally provides that the apparatus cover may be translucent and/or transparent with a plurality of illuminable elements thereunder providing an alarm visual display. Also provided is a remote control for actuating a projected display of time onto the wall. The apparatus is also a scale for displaying the user's weight. The weight requirement for deactivating the alarm can extend from placing the feet on the apparatus while still in bed or require the user to stand on the apparatus for said period of time. Further provided for is the removal of the alarm clock portion from the floor apparatus.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
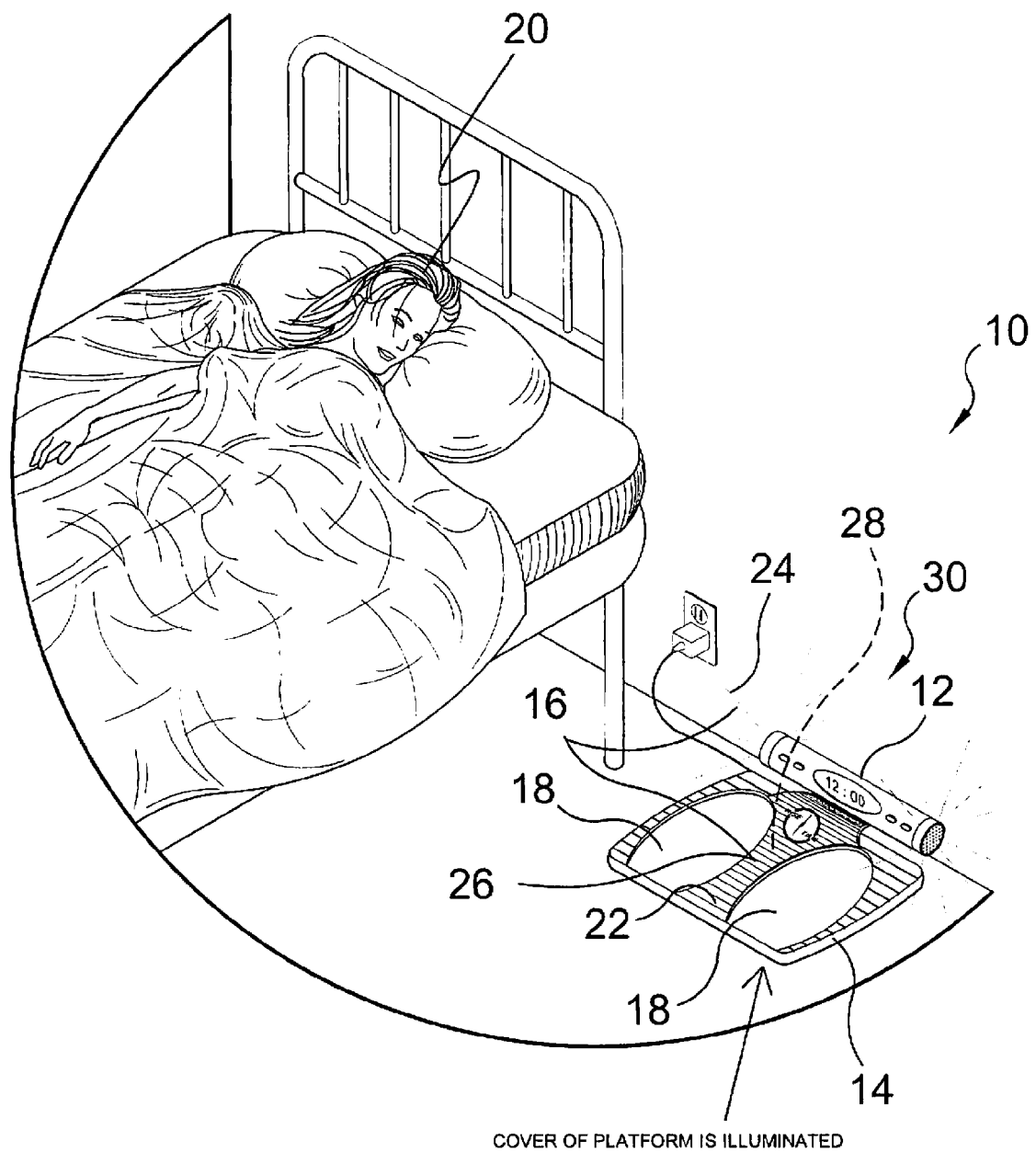
FIG. 1 is an illustrative view of the present invention in use.

Turning now descriptively to the drawings, in which similar reference characters denote similar elements throughout the several views, the figures illustrate the Foot Cancelled Alarm Clock with Digital Weight Display of the present invention. With regard to the reference numerals used, the following numbering is used throughout the various drawing figures.

10 Foot Cancelled Alarm Clock with Digital Weight Display of the present invention
12 alarm clock
14 base platform
16 alarm
18 footpad sensor of 14
20 user
21 foot of 20
22 cover of 14
24 audible alarm
26 visual alert
28 illuminable element
30 scale
32 power cord
34 power outlet
36 transformer
38 digital display
40 set buttons
42 audio speaker
44 battery status indicator LED
46 alarm clock cradle of 14
48 contact
50 flexible wire plug of 32
52 input jack of 14
54 rechargeable battery
56 microprocessor 58 battery controller
60 audio amplifier
62 weight calibration switch
64 alarm cancel switch
66 platform strain gage sensor

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 comprises an alarm clock 12 that uses a floor situated base platform 14 so that when the alarm 16 goes off, the user 20 must place their feet on footpad sensors 18 for a predetermined period of time to deactivate the alarm 16. The footpads 18 act as sensors to assure that both feet are placed on the platform 14 and to transfer weight data to the scale. The alarm sequence optionally provides that the platform 14 cover 22 may be translucent and/or transparent with a plurality of illuminable elements 28 thereunder providing the unit with an audible alarm 24 and/or a visual alert 26. The visual alert 26 will also aid the user 20 in locating the footpads 18 if it is dark. In the case of a hearing impaired user, strobes may be employed as the illuminable elements 28. Also provided is a remote control for actuating a projected display of time onto the wall. The apparatus is also a scale 30 for displaying the user's weight. The weight requirement for deactivating the alarm 12 can extend from placing the feet on the footpads 18 while still in bed or require the user 20 to stand on the apparatus for predetermined period of time, preferably at least three seconds. Further provided is for the removal of the alarm clock 12 from the base platform 14.

Figure 2:
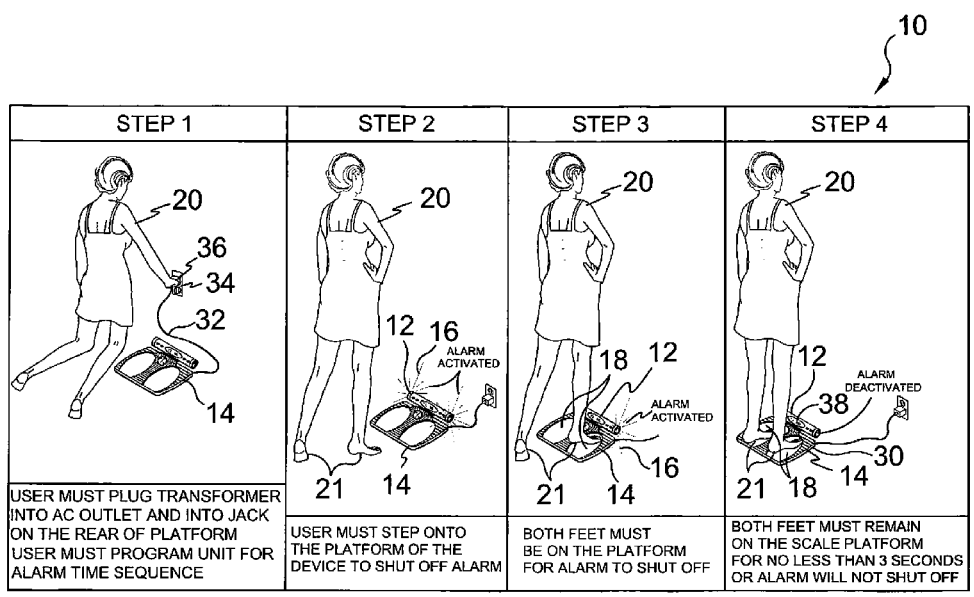
FIG. 2 is an illustrative chart of the present invention in use.

FIG. 2 is an illustrative chart of the present invention 10 in use. Shown is an illustrative chart of the activation and deactivation process of the present invention 10. The user 20 must first supply power to the base platform 14 by plugging the power cord 32 into a power outlet 34. A transformer 36 may also be employed, for illustrative purposes it is shown at the end of the power cord 32 and plugged into the outlet 34 although it may be situated anywhere in line therewith or within the base platform 14. The user 20 must then program the unit for alarm time sequence. Once the alarm 16 is activated, the user 20 must place both feet 21 on the respective footpads 18 for at least three seconds to deactivate the alarm 16. The shut off switch has a timed standing duration before shut-off. The base platform 14 includes a scale 30 for measuring the weight of user 20 and has a digital display 38 for displaying the weight or time and to assist the user 20 when programming the unit. The alarm clock 12 portion is removable from the base platform 14 and may be used independently from said device.

Figure 3:
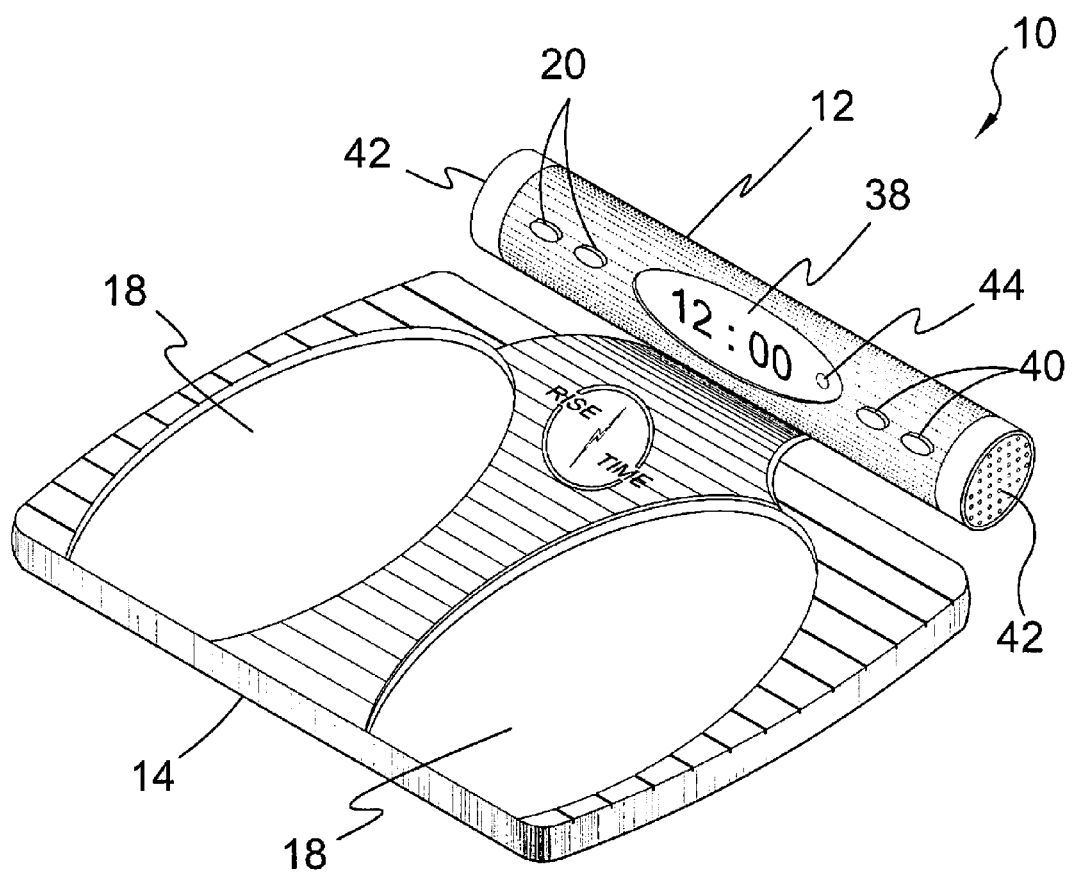
FIG. 3 is an assembled perspective view of the present invention.

FIG. 3 is an assembled perspective view of the present invention. Shown is the alarm clock 12 mounted on the platform 14. The alarm clock 12 includes a digital display 38 and a plurality of set buttons 40 to assist the user in programming the various functions. Audio speakers 42 are provided on the removable alarm clock 12 as well as a battery status indicator LED 44. The base platform 14 has a footpad 18 for each foot.

Figure 4:
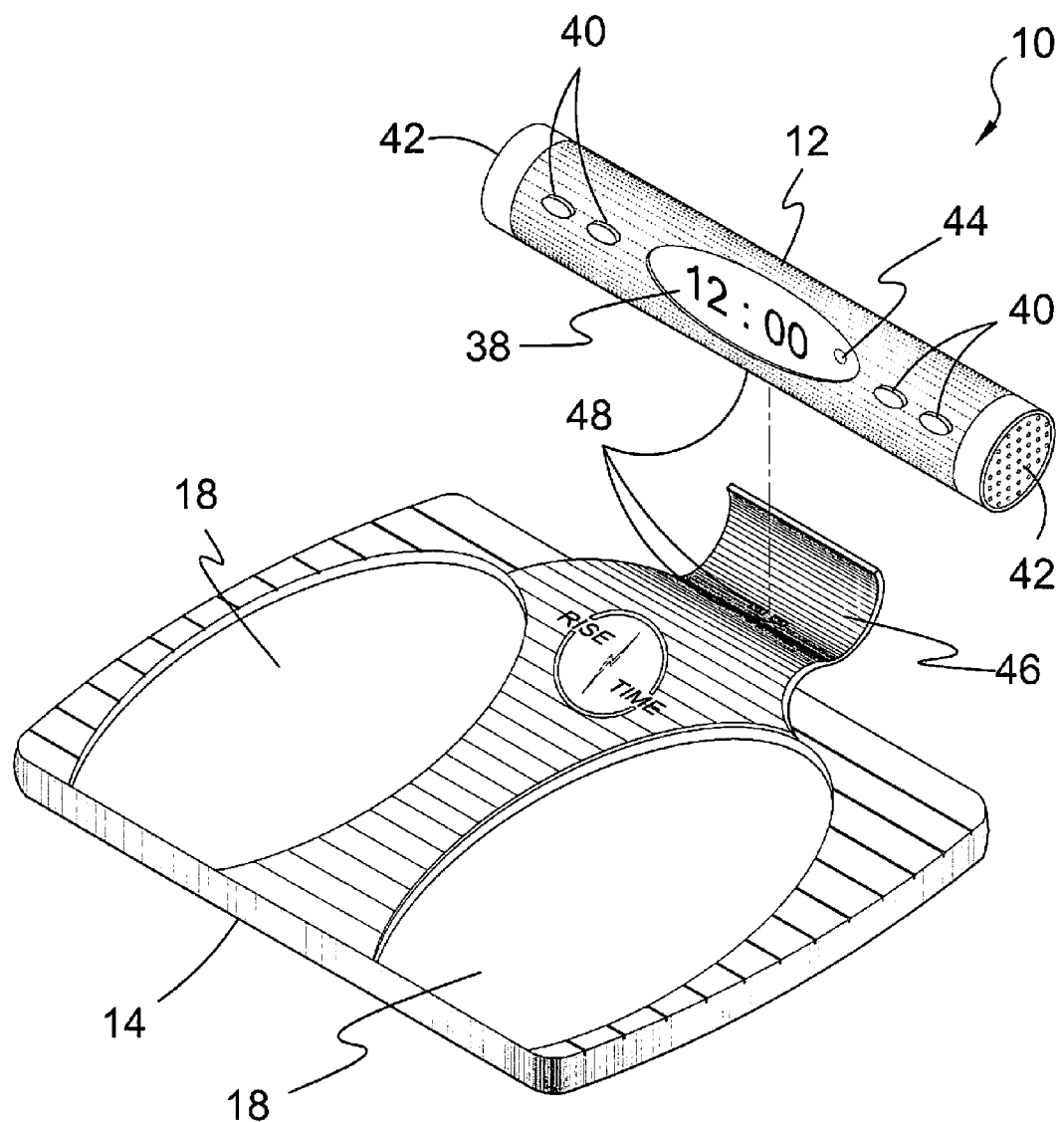
FIG. 4 is an exploded perspective view of the present invention.

FIG. 4 is an exploded perspective view of the present invention 10. Shown is the present invention 10 with alarm clock 12 removed from its cradle 46 on the base platform 14. The alarm clock 12 and cradle 46 have mating contacts 48 for transmitting and receiving data. The base platform 14 also serves as a charger for a rechargeable battery disposed within the alarm clock 12. The alarm clock 12 includes a digital display 38 and a plurality of set buttons 40 to assist the user in programming the various functions. Audio speakers 42 are provided on the removable alarm clock 12 as well as a battery status indicator LED 44. The base platform 14 has a footpad 18 for each foot.

Figure 5:
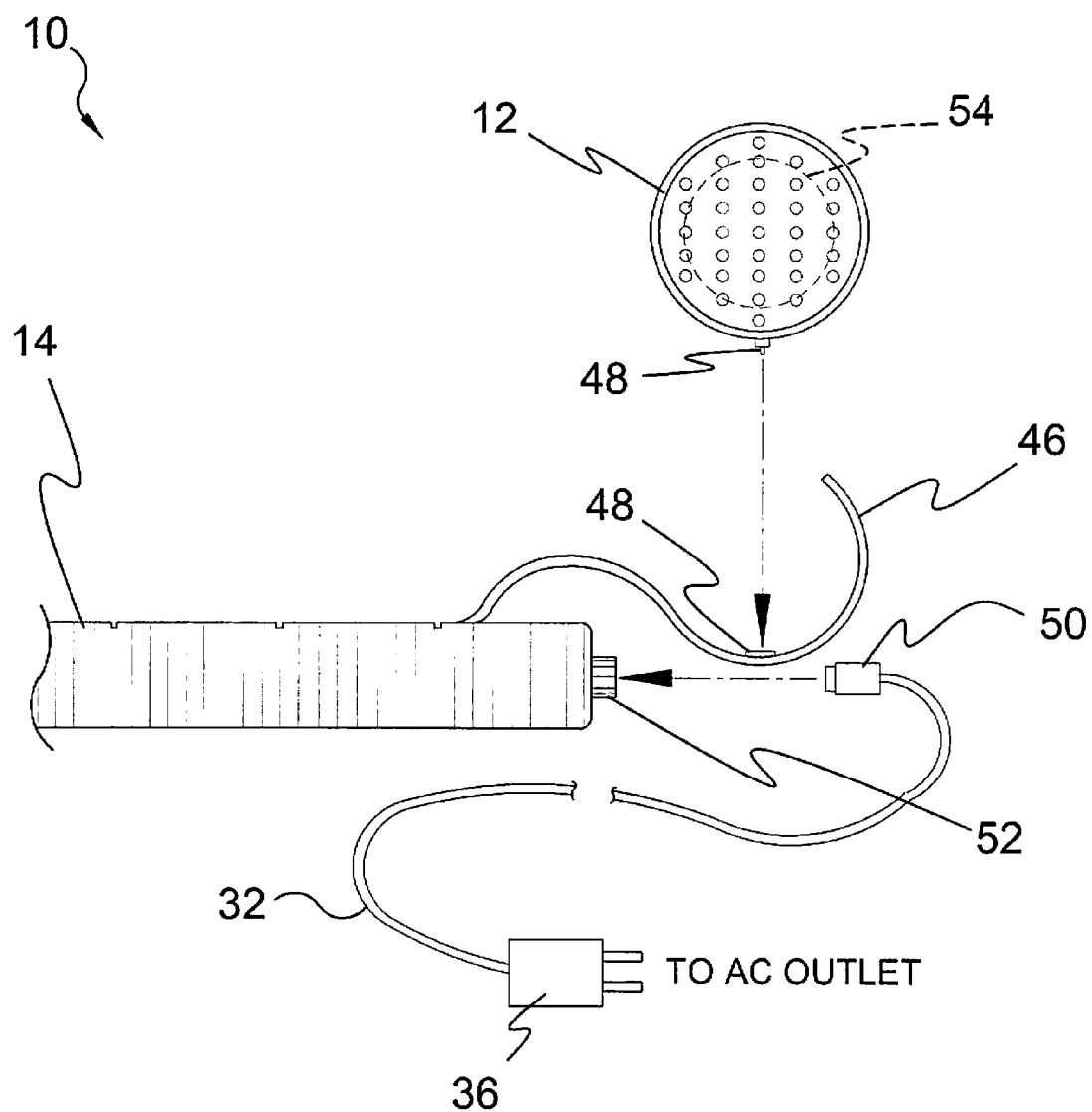
FIG. 5 is an exploded perspective view of the present invention.

FIG. 5 is an exploded perspective view of the present invention 10. The power cord 32 has a first end with the transformer 36 that plugs into an AC outlet and a second end with a flexible wire plug 50 that inserts into an input jack 52 located at the rear of the platform 14. The alarm clock 12 has at least one rechargeable internal battery 54 disposed therein and the base platform 14 serves as a charging unit when the alarm clock 12 is placed in the cradle 46 and the contacts 48 of the alarm clock 12 and the cradle 46 mate up. After a suitable time, the internal battery(s) 54 become charged and the device is ready to use. A low battery led located on the display will light red if battery voltage is low. When the batteries 54 are fully charged the led will be green.

Figure 6:
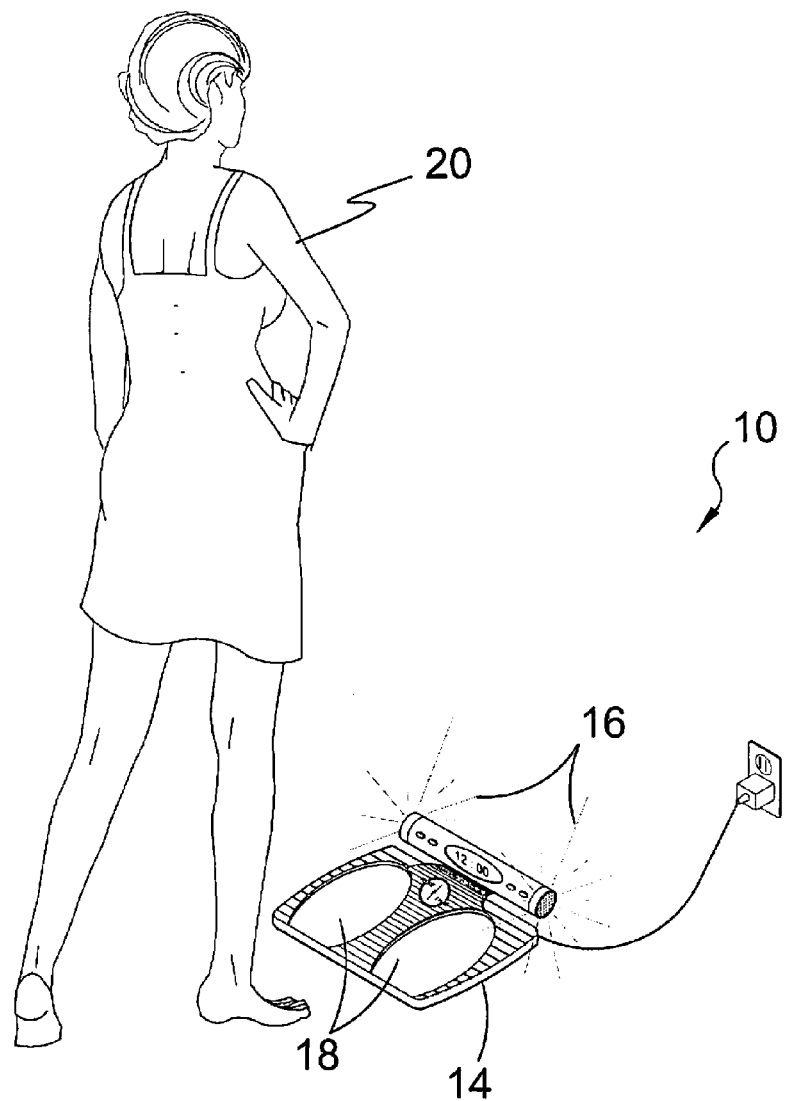
FIG. 6 is an illustrative view of the present invention in use.

FIG. 6 is an illustrative view of the present invention 10 in use. Shown is the first step to deactivating the alarm 16 of the present invention 10. When the alarm 16 goes off, the user 20 must acknowledge the alarm 16 and get up to go stand on the footpads 18 of the base platform 14.

Figure 7:
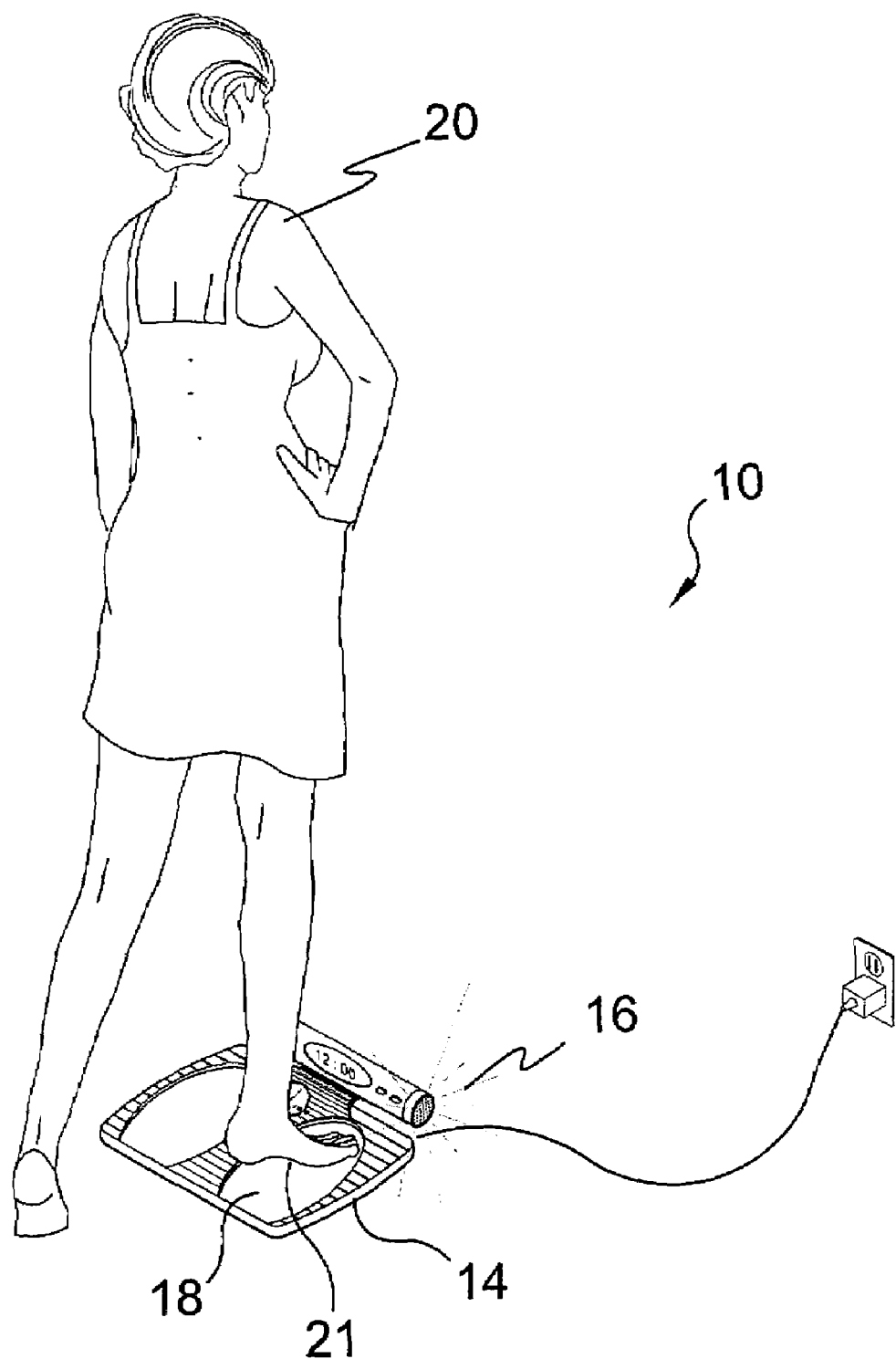
FIG. 7 is an illustrative view of the present invention in use.

FIG. 7 is an illustrative view of the present invention 10 in use. Shown is the second step to deactivating the alarm 16 of the present invention 10. The user 20 must stand on both footpads 18 of the base platform 14 in order to disable the alarm 16. In the illustration the user 20 only has one foot 21 on a footpad 18 which is inadequate for disabling the alarm 16.

Figure 8:
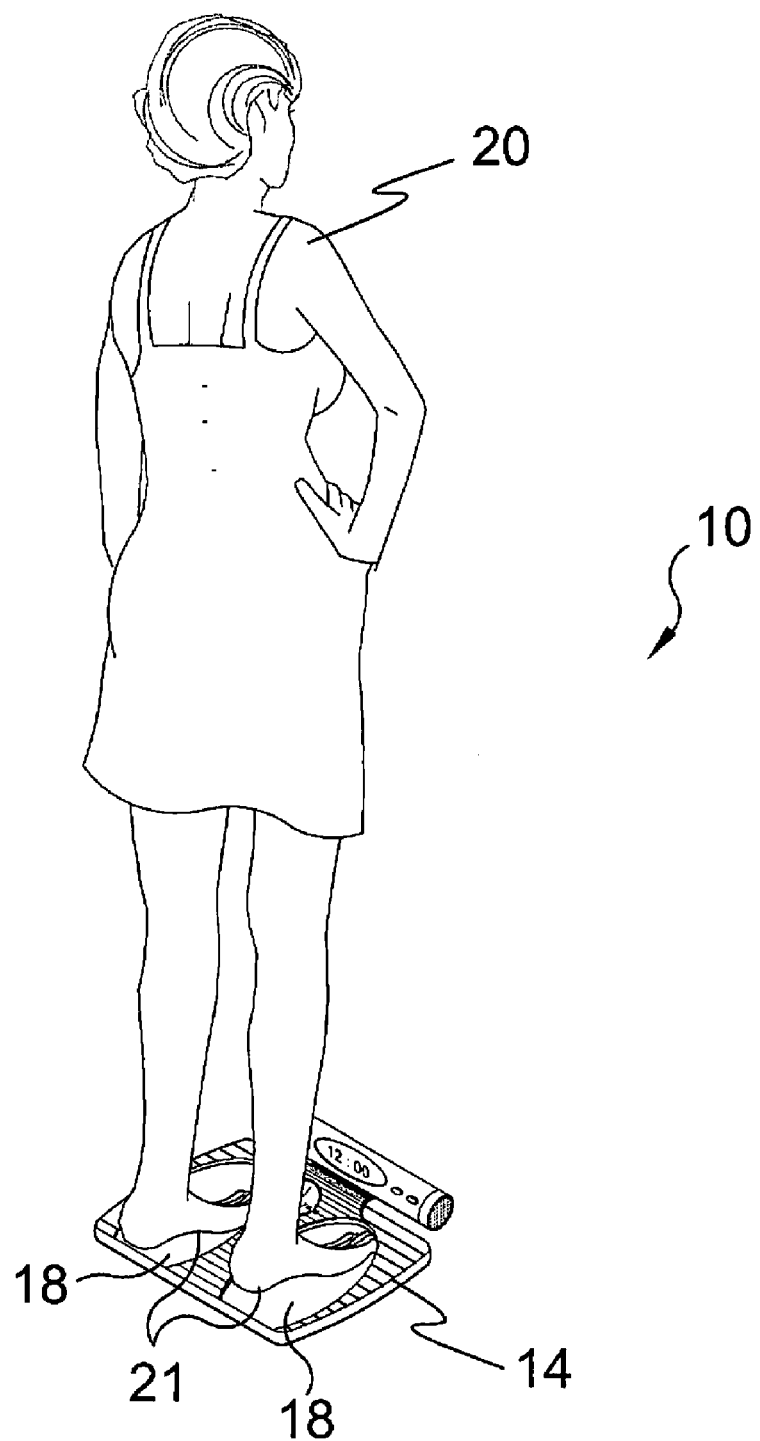
FIG. 8 is an illustrative view of the present invention in use.

FIG. 8 is an illustrative view of the present invention 10 in use. Shown is the third and final step to deactivating the alarm of the present invention 10. The user 20 must have both feet 21 on the footpads 18 of the platform 14 for at least three seconds in order to disable the alarm. The shut off switch has a timed standing duration of three seconds before it will shut off.

Figure 9:
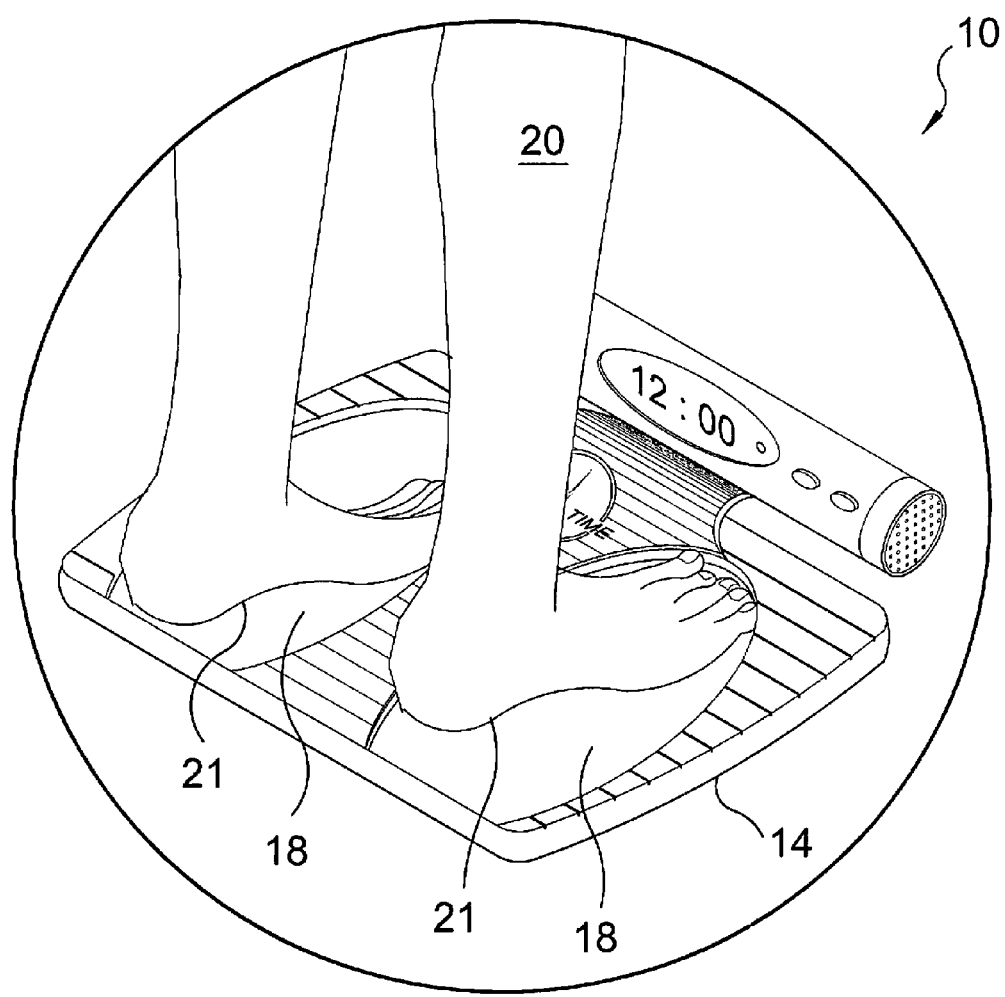
FIG. 9 is a detailed illustrative view of the present invention in use.

FIG. 9 is a detailed illustrative view of the present invention 10 in use. The user 20 stands with both feet 21 on the footpads 18 of the platform 14 to shut off the alarm. The shut off switch has a timed standing duration of three seconds before it will shut-off. The alarm has a scale for displaying weight of user 20 and also has a time display.

Figure 10:
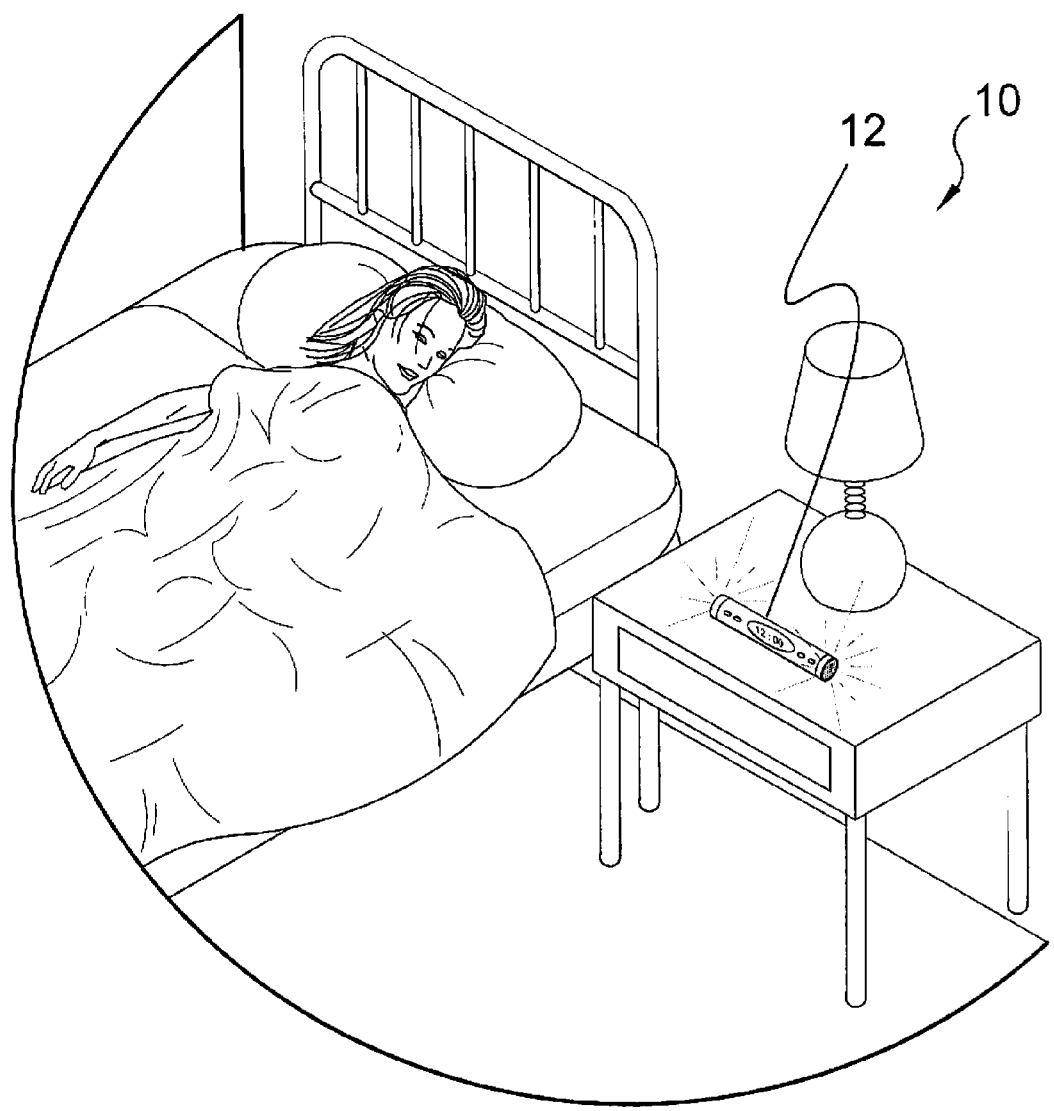
FIG. 10 is an illustrative view of the present invention in use.

FIG. 10 is an illustrative view of the present invention 10 in use. The alarm clock 12 is removable from the cradle of the base platform and may be used independently from said device.

Figure 11:
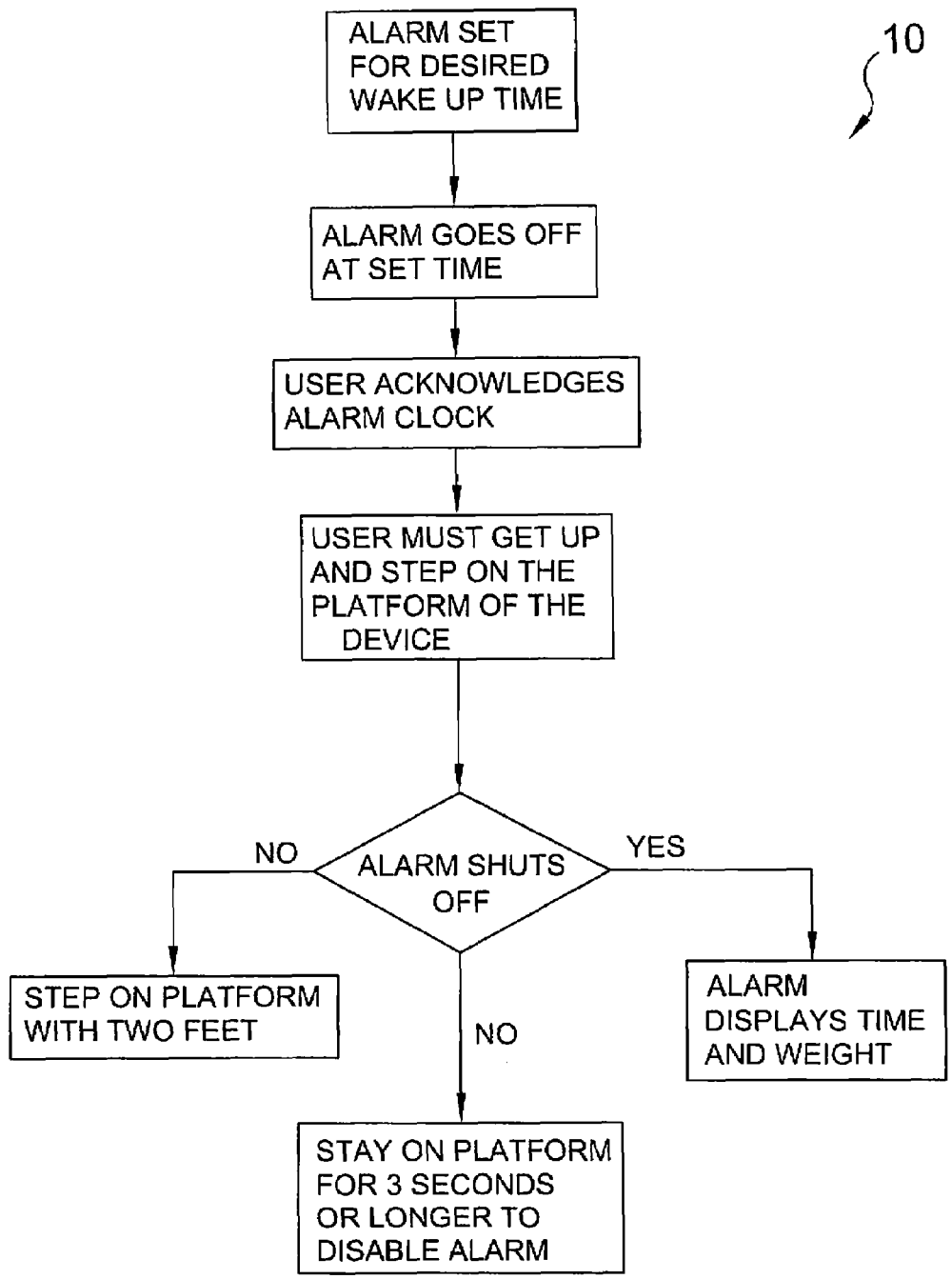
FIG. 11 is a logic chart of the present invention.

FIG. 11 is a logic chart of the present invention 10. Shown are the steps involved in operating the present invention 10 which include in the following sequence: setting the alarm for the desired wake up time; the alarm activating at set time; user acknowledging said alarm; user getting up and stepping on the footpads of the platform with both feet for at least three seconds, the alarm shutting off and the digital display on the alarm clock showing the time and weight of the user.

Figure 12:
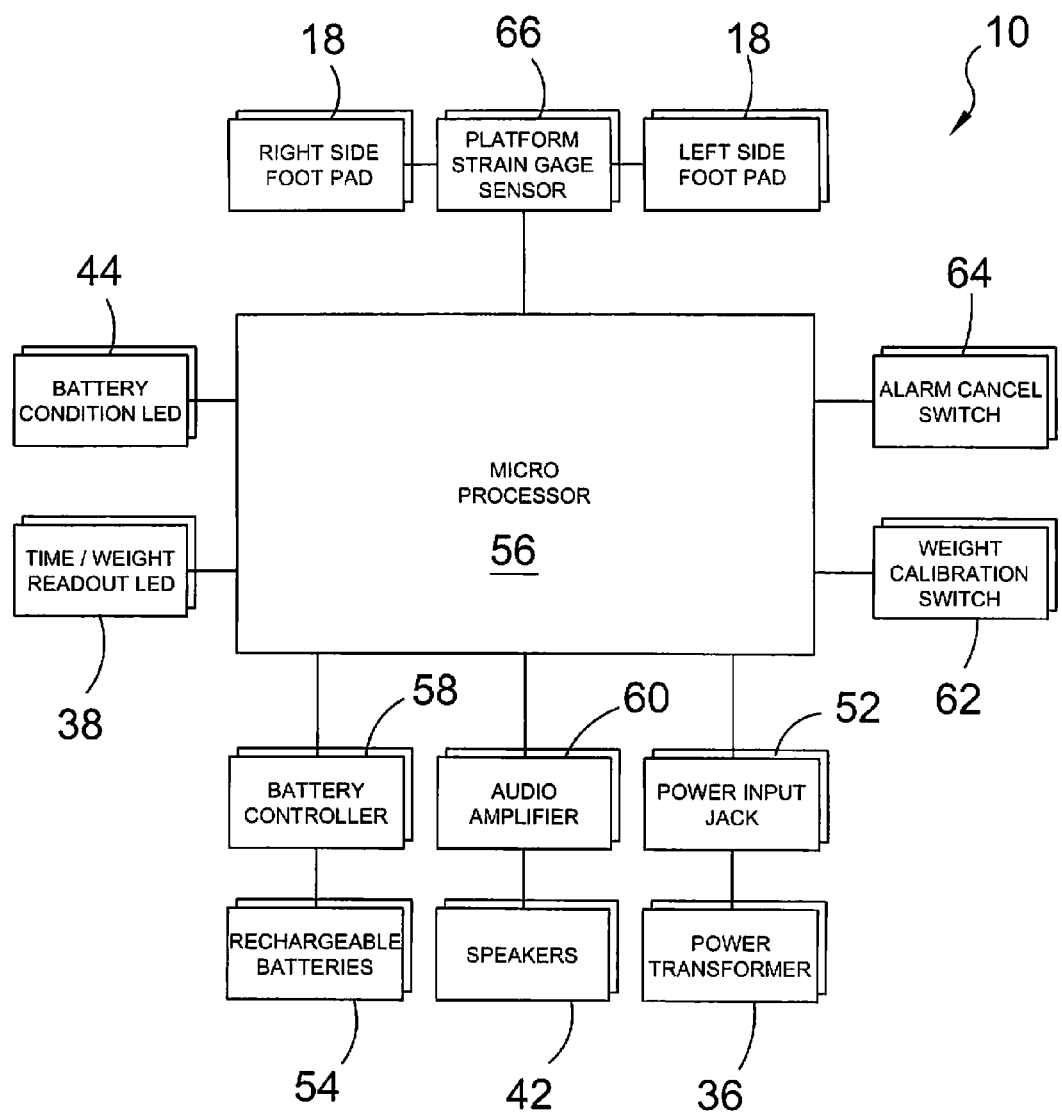
FIG. 12 is a block diagram of the present invention.

FIG. 12 is a block diagram of the present invention 10. Shown is a block diagram of the component interface of the present invention 10, a foot canceled wakeup alarm with digital weight display. Power is supplied to the microprocessor 56 via a power transformer 36 plugged into an AC power source and a power input jack 52. The left and right footpads 18 detect pressure thereupon and the platform strain gage sensor 66 relays the weight thereon to the microprocessor 56 which compares it to the input from the weight calibration switch 62. The alarm cancel switch 64 must be enabled for at least three seconds before disabling the audio amplifier 60 and the speakers 42. The battery condition LED 44 indicates the status on the charge of the rechargeable battery 54 as controlled by the battery controller 58. The digital display 38 functions as a time/weight readout LED.

Figure 13:
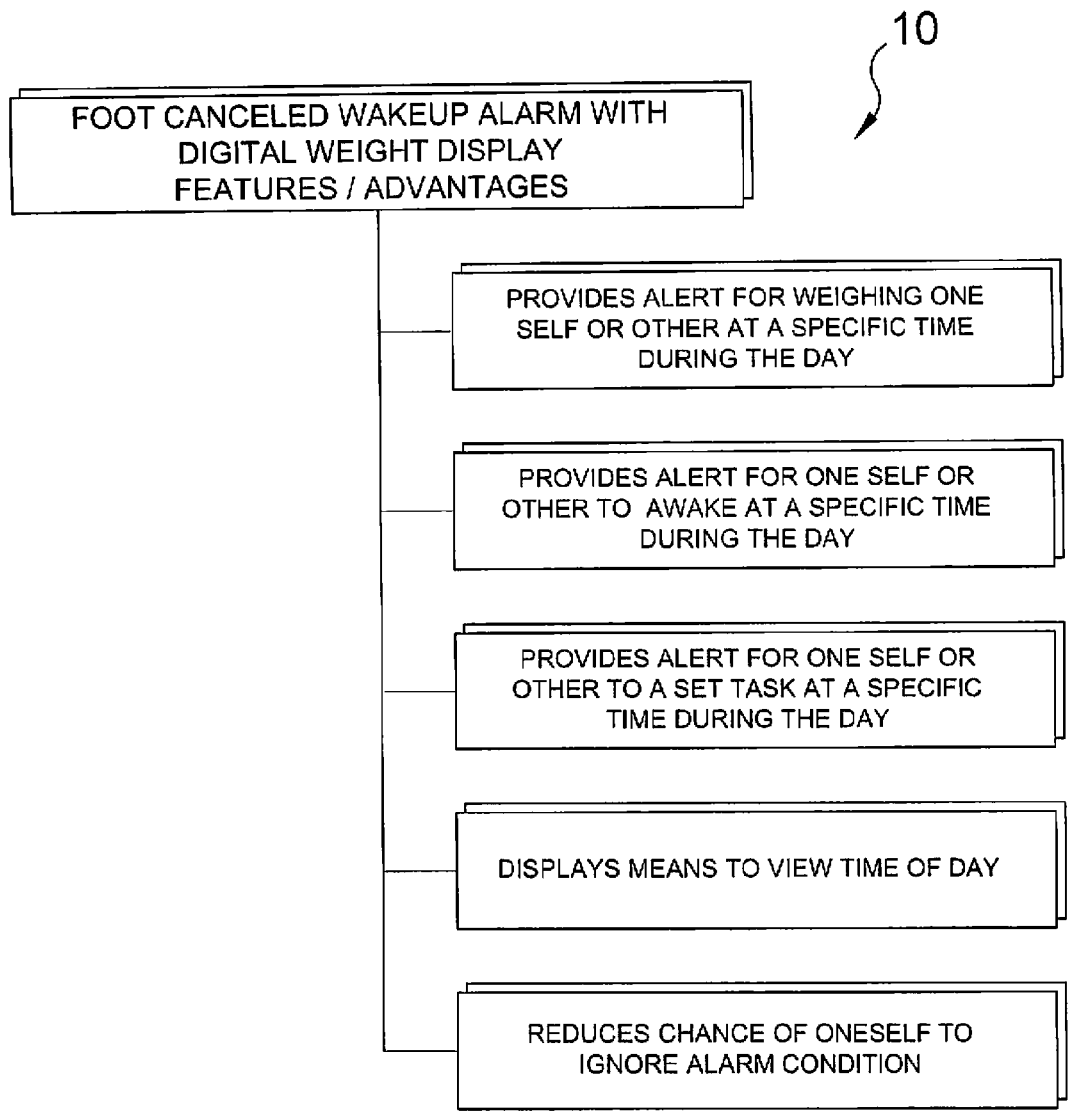
FIG. 13 is a block diagram of the present invention.

FIG. 13 is a block diagram of the present invention 10. Shown is a block diagram of the features and advantages of the present invention 10, a foot canceled wakeup alarm with digital weight display. The present invention 10 provides an alert to weigh in, an alert to wake up at a specific time, an alert to perform a task at a certain time, a clock and it reduces the risk of ignoring the alarm.

Figure 14:
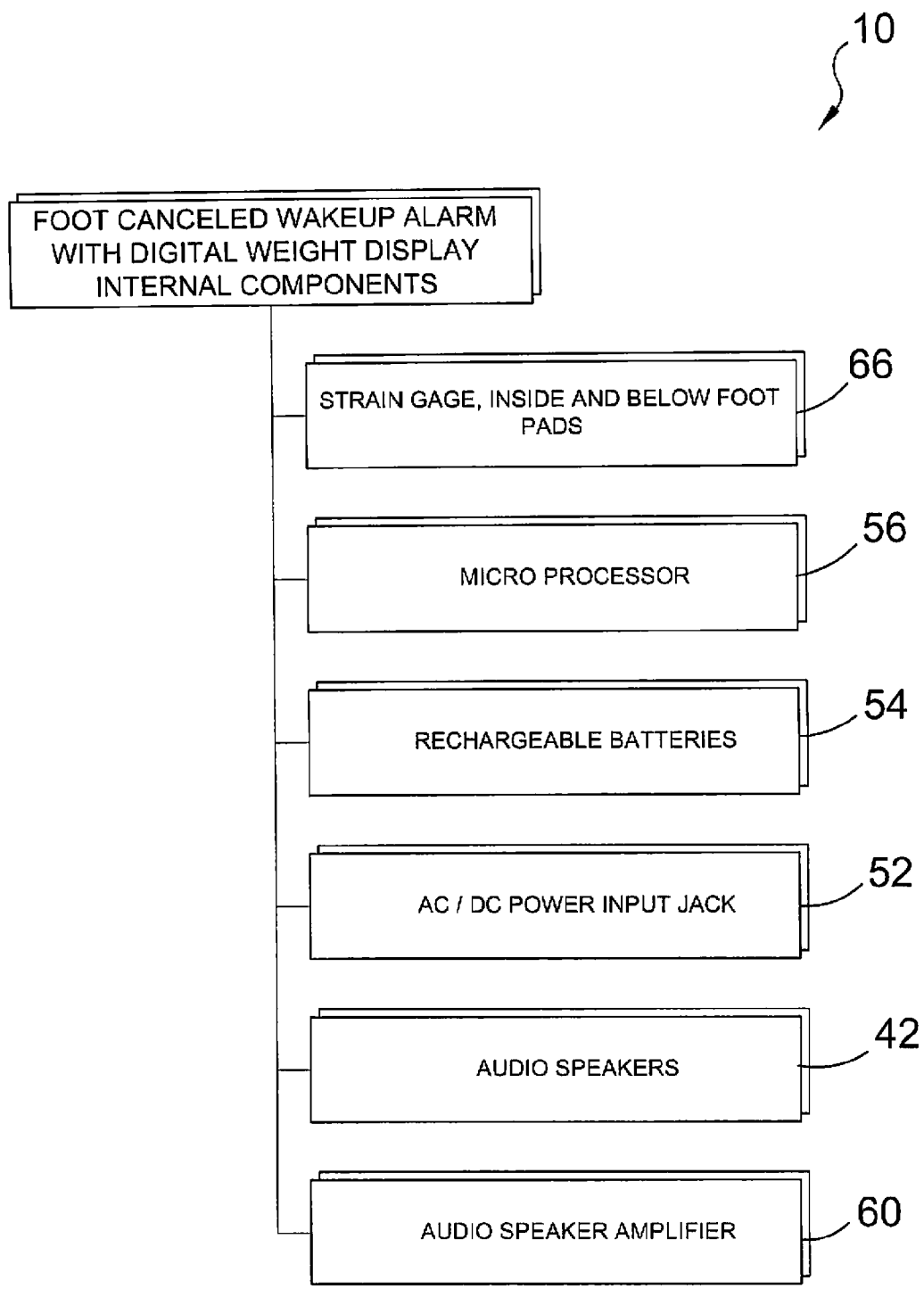
FIG. 14 is a block diagram of the present invention.

FIG. 14 is a block diagram of the present invention 10. Shown is a block diagram of the interior components of the present invention 10, a foot canceled wakeup alarm with digital weight display. Among the internal components are: a strain gage 66; a microprocessor 56; rechargeable batteries 54; an AC/DC power input jack 52; audio speakers 42 and an audio speaker amplifier 60.

Figure 15:
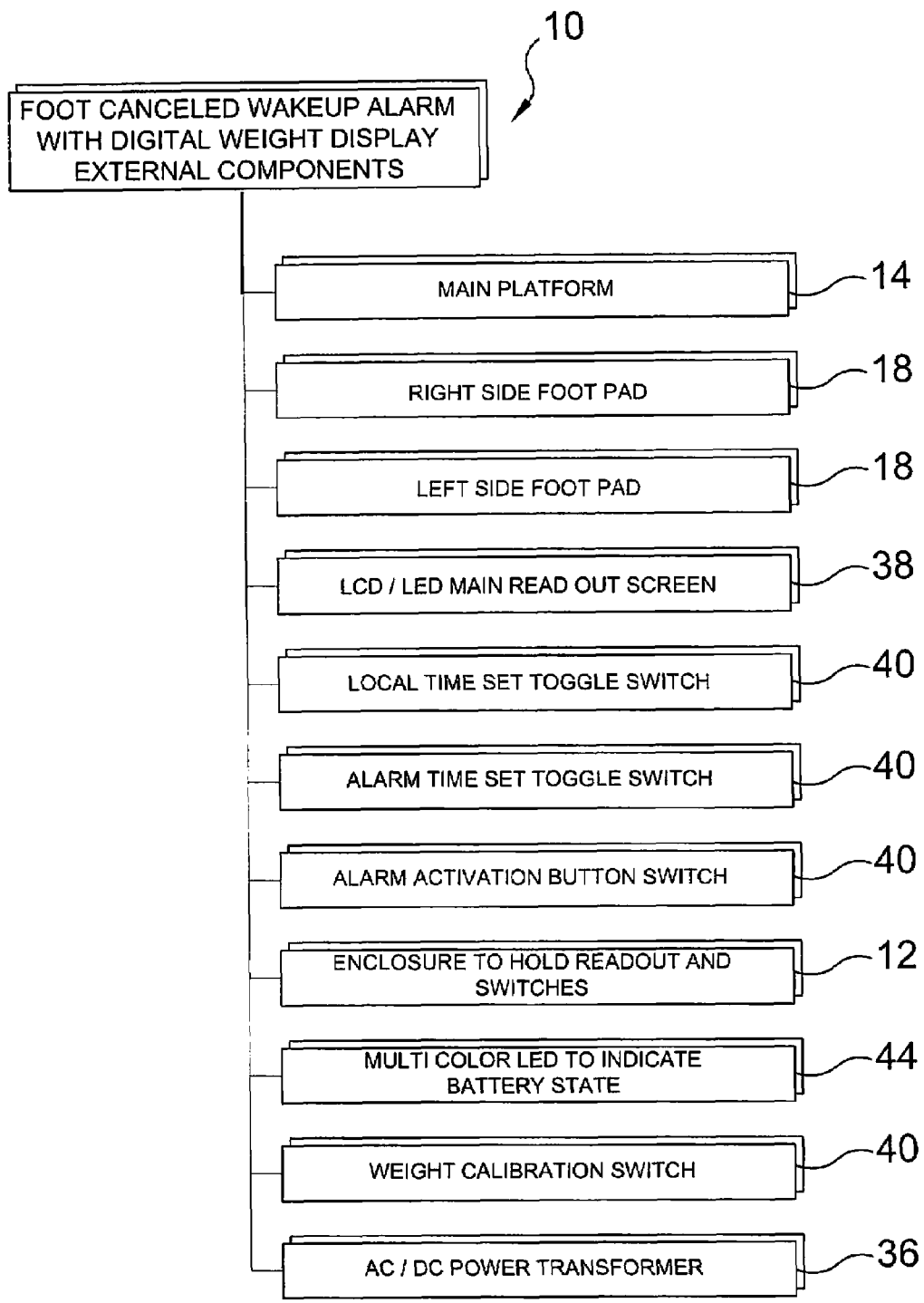
FIG. 15 is a block diagram of the present invention.

FIG. 15 is a block diagram of the present invention 10. Shown is a block diagram of the external components of the present invention 10, a foot canceled wakeup alarm with digital weight display. Among the external components are: the platform; right and left footpads 18; digital display 38; local time set toggle switch 40; alarm time set toggle switch 40; alarm time set toggle switch 40; alarm activation button switch 40, enclosure to hold readout and switches 12; multicolored LED 44 to indicate battery state; weight calibration switch 40 and an AC/DC power transformer 36.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is:

1. A foot terminated alarm clock and scale comprising:
   a) a base platform with integral scale;
   b) an alarm clock unit with alarm;
   c) means for releasably securing said alarm clock to said platform;
   d) means for inputting, acquiring, storing and transferring data between said alarm clock and said platform;
   d) means for disabling said alarm once activated by assuring that a user has two feet on said platform and said scale registers that the weight thereupon meets or exceeds a predetermined value.

2. The foot terminated alarm clock and scale recited in claim 1, wherein said alarm clock further comprises:
   a) a digital display;
   b) user set controls;
   c) at least one audio speaker to provide an audible alarm; and
   d) at least one internal rechargeable battery.

3. The foot terminated alarm clock and scale recited in claim 1, wherein said platform further comprises;
   a) a strain gage sensor for measuring the weight applied thereto;
   b) a pair of footpad sensors for assuring that two feet are placed upon said platform and for transferring weight to said strain gage sensor for the measurement thereof;
   c) a cradle for releasably securing said alarm clock thereto; and
   d) means for receiving power from an external power source.

4. The foot terminated alarm clock and scale recited in claim 3, wherein said power receiving means is a power cord having a first end with an AC/DC transformer that plugs into a typical power outlet and a second end having a flexible wire plug.

5. The foot terminated alarm clock and scale recited in claim 4, wherein said flexible wire plug is inserted into an input jack integral with said platform to supply power thereto.

6. The foot terminated alarm clock and scale recited in claim 3, wherein said cradle and said alarm clock include contacts to provide a connection for transferring data and power therebetween.

7. The foot terminated alarm clock and scale recited in claim 6, wherein said platform functions as a charging unit for a rechargeable battery of said alarm clock.

8. The foot terminated alarm clock and scale recited in claim 6, further including a microprocessor for receiving input from the various components and enabling and disabling reactive functions accordingly.

9. The foot terminated alarm clock and scale recited in claim 2, wherein the user depresses said set controls and digital display to select the time to enable the alarm and the weight to be applied to footpads to disable the same.

10. The foot terminated alarm clock and scale recited in claim 9, further including an alarm cancel switch that is in communication with said footpads, a strain gage sensor and a microprocessor.

11. The foot terminated alarm clock and scale recited in claim 10, whereupon activation of said alarm requires the user to acknowledge said alarm and step on both footpads for at least three seconds for the microprocessor to activate the alarm cancel switch.

12. The foot terminated alarm clock and scale recited in claim 11, wherein said alarm cancel switch will not activate unless the weight applied to set footpads meets or exceeds the weight set by the user.

13. The foot terminated alarm clock and scale recited in claim 12, wherein deactivation of said alarm switches the function thereof to a scale and displays the weight of the user standing thereon.

14. The foot terminated alarm clock and scale recited in claim 13, wherein the digital display returns to its function as a clock once the user steps off of said footpads.

15. The foot terminated alarm clock and scale recited in claim 3, wherein said alarm clock may be removed from said cradle and used independently as an alarm clock.

16. The foot terminated alarm clock and scale recited in claim 15, wherein said alarm clock further includes a battery status indicator LED to inform the user of the charge on an internal battery.

17. The foot terminated alarm clock and scale recited in claim 16, wherein said battery status indicator LED is green when said battery has an adequate charge and red when the charge is low.

18. The foot terminated alarm clock and scale recited in claim 1, further including a visual alarm.

19. The foot terminated alarm clock and scale recited in claim 18, wherein said visual alarm comprises a translucent cover member on said platform with an illuminable element disposed thereunder.

* * * * *